United States Patent
Okayama et al.

(10) Patent No.: US 6,326,080 B1
(45) Date of Patent: Dec. 4, 2001

(54) BIAXIALLY ORIENTED POLYPROPYLENE-BASE FILM

(75) Inventors: Chikashi Okayama; Takanori Nakashima; Yasuhiro Shiraishi; Noriaki Saito; Yuya Ishimoto, all of Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/319,355

(22) PCT Filed: Dec. 16, 1997

(86) PCT No.: PCT/JP97/04641

§ 371 Date: Sep. 2, 1999

§ 102(e) Date: Sep. 2, 1999

(87) PCT Pub. No.: WO98/27144

PCT Pub. Date: Jun. 25, 1998

(30) Foreign Application Priority Data

Dec. 17, 1996 (JP) .................................................. 8-337218

(51) Int. Cl.⁷ .............................. B32B 5/16; B32B 27/32
(52) U.S. Cl. ........................... 428/327; 428/910; 525/240
(58) Field of Search ........................... 525/240; 428/327, 428/910, 515, 516

(56) References Cited

U.S. PATENT DOCUMENTS 4,975,469 * 12/1990 Jacoby et al. ........................ 521/84.1
6,141,149 * 10/2000 Carlson et al. ....................... 359/500

FOREIGN PATENT DOCUMENTS 0 719 829   7/1996  (EP) .

OTHER PUBLICATIONS

Patent Abstracts of Japan, (vol. 011, No. 053): JP 61–213244, *Hajime*, (Abstract), Sep. 22, 1986.
Database WPI (Section Ch. Week 199347): JP 05–279505, *Gunze KK*, (Abstract), Oct. 26, 1993.
Database WPI (Section Ch. Week 197847): JP 53 120759, *Sumitomo Chem. Co. Ltd.*, (Abstract), Oct. 21, 1978.
Patent Abstracts of Japan (vol. 1996, No. 03): JP 07 309985, *Showa Denko KK*(Abstract), Nov. 28, 1995.
Database WPI (Section Ch. Week 197818): JP 53 031741, *Toray Ind. Inc.*, (Abstract) Mar. 25, 1978.
Patent Abstracts Of Japan; vol. 1996, No. 04, JP 07 329177, *Toray Ind. Inc.* (Abstract), Dec. 19, 1995.

* cited by examiner

Primary Examiner—Paul Thibodeau
Assistant Examiner—D. Lawrence Tarazano
(74) Attorney, Agent, or Firm—Kilpatrick Stockton LLP

(57) ABSTRACT

To provide an economically advantageous biaxially oriented polypropylene-based film, which is excellent in straight cuttability along the MD direction, strength along the TD direction and transparency, a film-forming material which comprises a polypropylene-based resin material consisting of 40 to 88% by weight of crystalline polypropylene, and 60 to 12% by weight of propylene-α-olefin copolymer dispersed as particles in the crystalline polypropylene is biaxially oriented to afford a biaxially oriented polypropylene-based film wherein the particles of the copolymer have a mean dispersed particle diameter of 0.1 μm or less along the TD direction.

9 Claims, No Drawings

BIAXIALLY ORIENTED POLYPROPYLENE-BASE FILM

TECHNICAL FIELD

The present invention relates to a biaxially oriented film formed from a film-forming material comprising a polypropylene-based resin material. More precisely, it relates to a biaxially oriented polypropylene-based film having straight tearing property along the longitudinal direction.

BACKGROUND ART

Oriented films formed from polypropylene-based resin materials are used as various package films. For example, uniaxially oriented polypropylene-based films have a property that they are likely to be torn along the film-flowing direction during the film production, i.e., the longitudinal direction called machine direction (MD direction), and thus they are easily cut straight along that direction (straight cuttability). Therefore, they are widely used mainly in the field of food packaging.

While uniaxially oriented films comprising polypropylene-based resin materials are excellent in the straight cuttability along the MD direction, however, they are poor in the strength along the direction perpendicular to the MD direction (TD direction), and therefore they may be broken when used for packaging heavy contents.

As a film for packaging heavy contents having straight cuttability and improved strength along the TD direction, there have been known those produced by a method utilizing polypropylene formulated with polybutene (Japanese Patent Unexamined Publication No. 7-156264). While this method improves the strength along the TD direction, however, it cannot afford straight cuttability along the MD direction at a sufficient level. In addition, it suffers a problem concerning the cost, because it utilizes a large amount of expensive polybutene.

DESCRIPTION OF THE INVENTION

The object of the present invention is to provide a biaxially oriented polypropylene-based film that is excellent in straight cuttability along the MD direction and strength along the TD direction, and is economically advantageous.

The present inventors earnestly conducted studies in order to achieve the foregoing object, and as a result, they found that a biaxially oriented film of a polypropylene-based resin material comprising a copolymer of propylene and another α-olefin dispersed as particles in crystalline polypropylene wherein the film is formed so that the dispersed particles of the copolymer should have a mean diameter of 0.1 μm or less along the TD direction exhibits excellent straight cuttability along the MD direction. Thus, they accomplished the present invention.

That is, the present invention provides a biaxially oriented polypropylene-based film formed from a film-forming material which comprises a polypropylene-based resin material consisting of 40 to 88% by weight of crystalline polypropylene, and 60 to 12% by weight of propylene-α-olefin copolymer dispersed as particles in the crystalline polypropylene, wherein the particles of the copolymer have a mean dispersed particle diameter of 0.1 μm or less along the TD direction.

The present invention also provides a biaxially oriented polypropylene-based film formed from a film-forming material which comprises a polypropylene-based resin material consisting of 40 to 88% by weight of crystalline polypropylene, and 60 to 12% by weight of propylene-α-olefin copolymer, wherein a ratio of birefringences along the MD direction and the TD direction (birefringence along the MD direction/birefringence along the TD direction) and a ratio of orienting ratios for the MD direction and the TD direction (orienting ratio for the MD direction/orienting ratio for the TD direction) of the film satisfy the following equation (I):

$$Y \geq X - 0.1 \qquad (I)$$

wherein X represents the ratio of orienting ratios, and Y represents the ratio of birefringences.

The present invention also provides a biaxially oriented polypropylene-based film formed from a film-forming material which comprises a polypropylene-based resin material consisting of 40 to 88% by weight of crystalline polypropylene, and 60 to 12% by weight of propylene-α-olefin copolymer, wherein a ratio of birefringences along the MD direction and the TD direction (birefringence along the MD direction/birefringence along the TD direction) of the film is 0.6 or more.

The present invention further provides a biaxially oriented polypropylene-based film formed from a film-forming material which comprises a polypropylene-based resin material consisting of 40 to 88% by weight of crystalline polypropylene, and 60 to 12% by weight of propylene-α-olefin copolymer, and having a ratio of MFRs of the crystalline polypropylene and the propylene-α-olefin copolymer (MFR of the crystalline polypropylene/MFR of the propylene-α-olefin copolymer) of 10 or less, wherein the film is biaxially oriented so that a ratio of orienting ratios for the MD direction and the TD direction (orienting ratio for the MD direction/orienting ratio for the TD direction) should be 0.3 to 1.6.

The biaxially oriented film of the present invention comprises the fine copolymer particles dispersed in a matrix of the crystalline polypropylene, and such a oriented film having such a dispersion structure composed of a polyolefin-based resin material has been made by the present invention for the first time. In the biaxially oriented film of the present invention, the ratio of birefringences along the MD direction and the TD direction satisfies the certain condition.

The present invention is based on the finding that such characteristics as mentioned above can provide a oriented film that is excellent in the straight cuttability along the MD direction and strength along the TD direction, and exhibits high transparency and good economy. While the production method therefor is not particularly limited so long as a oriented film having such characteristics can be obtained, a biaxially oriented polypropylene-based film which is composed of a polypropylene-based resin material having a ratio of MFRs of the crystalline polypropylene and the propylene-α-olefin copolymer of 10 or less, and oriented under the certain conditions can have the aforementioned characteristics.

The biaxially oriented film of the present invention is useful as a film for package, in particular, as a film for packaging heavy contents.

Preferred embodiments of the present invention will be explained hereinafter.

(1) Polypropylene-based Resin Material of the Present Invention

The film-forming material for forming the biaxially oriented film of the present invention comprises a polypropylene-based resin material that consists of crystalline polypropylene and propylene-α-olefin copolymer, the copolymer being dispersed as particles in the crystalline polypropylene (the copolymer is dispersed as domains in a matrix of the crystalline polypropylene).

(i) Crystalline Polypropylene

The crystalline polypropylene used for the present invention is a crystalline polymer comprising principally of propylene units, and preferably comprises 90% by weight or more of the propylene units based on the whole polymer. Specifically, it may be a homopolymer of propylene, or it may be a random copolymer comprising 90% by weight or more of propylene units and less than 10% by weight of α-olefin. When it is a copolymer, the α-olefin may include ethylene, 1-butene, 1-pentene, 1-hexene, 1-octene, 1-decene, 1-dodecene, 4-methyl-l-pentene, 3-methyl-1-pentene, and the like. It is preferable in view of the production cost to use a propylene homopolymer or propylene-ethylene copolymer having a propylene unit content of 90% by weight or more.

The melt flow rate (abbreviated as "MFR" hereinafter) of the crystalline polypropylene is preferably in the range of 0.1–50 g/10 minutes in view of the stability upon film-forming.

(ii) Propylene-α-olefin Copolymer

The propylene-α-olefin copolymer used for the present invention is a random copolymer of propylene and an α-olefin other than propylene. The content of propylene unit is preferably in the range of 20–80% by weight, more preferably 20–75% by weight, particularly preferably 20–70% by weight of the whole copolymer. When the content of propylene unit exceeds 80%, the desired dispersed distribution of the copolymer particles (referred to as "copolymer domains" hereinafter) in the matrix of crystalline polypropylene may not be obtained, and hence the improvements of the straight cuttability along the MD direction and the strength along the TD direction targeted in the present invention may not be obtained. On the other hand, when it is less than 20% by weight, transparency is disadvantageously degraded.

As the α-olefin other than propylene, ethylene, 1-butene, 1-pentene, 1-hexene, 1-octene, 1-decene, 1-dodecene, 4-methyl-1-pentene, 3-methyl-1-pentene and the like can be mentioned. Among these, a propylene-ethylene copolymer containing ethylene as the α-olefin is preferably used because it is beneficial to the production cost.

While MFR of the propylene-α-olefin copolymer used for the present invention is not particularly limited, it is preferably in the range of 0.1–20 g/10 minutes.

More preferably, MFR of the propylene-α-olefin copolymer is preferably selected so that its ratio with that of the crystalline polypropylene (MFR of the crystalline polypropylene/MFR of the propylene-α-olefin copolymer, simply referred to as "MFR ratio" hereinafter) should be 10 or less, more preferably fall within the range of 0.1–5.

(iii) Polypropylene-based Resin Material

In the polypropylene-based resin material of the present invention, the content of the crystalline polypropylene is 40–88% by weight, preferably 50–85% by weight, and the content of the propylene-α-olefin copolymer is 60–12% by weight, preferably 50–15% by weight based on the whole polypropylene-based resin material. When the ratio of the copolymer is less than 12% by weight, good straight cuttability along the longitudinal direction cannot be obtained. When it exceeds 60%, the rigidity of the film is markedly decreased, and it is not preferred for practical use.

The production method of the polypropylene-based resin material is not particularly limited, and it can be obtained by any kind of method. For example, it can be obtained by mixing crystalline polypropylene and propylene-α-olefin copolymer, which were polymerized separately, through melt-kneading or the like. Alternatively, it can be obtained by successively producing crystalline polypropylene and propylene-α-olefin copolymer by multi-step polymerization.

Specifically, a method based on melt-kneading of propylene-α-olefin copolymer polymerized by using a Ziegler-Natta catalyst such as a titanium-supported catalyst or a commercially available ethylene-propylene rubber and crystalline polypropylene can be exemplified. As the method for continuously polymerizing crystalline polypropylene and propylene-α-olefin copolymer by multi-step polymerization, for example, a method comprising producing crystalline polypropylene in the first step, and producing propylene-α-olefin copolymer in the second step by utilizing a plurality of polymerization reaction vessels can be exemplified. This continuous polymerization method is preferred, because it can be performed at a lower cost compared with the aforementioned melt-mixing method, and can afford a polypropylene-based resin material where the propylene-α-olefin copolymer is uniformly dispersed in the crystalline polypropylene, and it is suitable for stably realizing the desired quality (straight cuttability).

As the polypropylene-based resin material of the present invention, particularly preferred are those produced by the aforementioned continuous polymerization method so that the resulting material should have the MFR ratio of the crystalline polypropylene and the propylene-α-olefin copolymer (MFR of the crystalline polypropylene/MFR of the propylene-α-olefin copolymer) of 10 or less, more preferably in the range of 0.1–5. By selecting the MFR ratio in the aforementioned range, there can be obtained a film-forming material which can afford a oriented polypropylene-based film comprising the propylene-α-olefin copolymer uniformly and finely dispersed in the crystalline polypropylene, and exhibiting further improved straight cuttability and strength.

Specifically, polypropylene-based resin materials having such an MFR ratio can be produced by the methods mentioned in Japanese Patent Unexamined Publication Nos. 6-239918, 8-27238, and the like.

The MFR ratio can usually be calculated by measuring MFR of the crystalline polypropylene and the propylene-α-olefin copolymer respectively, but when the polypropylene-based resin material is continuously produced by the multi-step polymerization method (the crystalline polypropylene is polymerized first, and then the propylene-α-olefin copolymer is polymerized), MFR of the propylene-α-olefin copolymer cannot be directly measured. In such a case, the MFR of the propylene-α-olefin copolymer can be obtained from MFR of the crystalline polypropylene, which can be directly measured, MFR of the obtained polypropylene-based resin material, and the content of the propylene-α-olefin copolymer in the polypropylene-based resin material according to the following equation:

$$\log(MFR_{RC}) = \frac{\log(MFR_{whole}) - (1 - W_{RC}/100)\log(MFR_{PP})}{W_{RC}/100}$$

| | |
|---|---|
| $MFR_{RC}$ | MFR of propylene-α-olefin copolymer |
| $MFR_{whole}$ | MFR of polypropylene-based resin material |
| $MFR_{PP}$ | MFR of crystalline polypropylene |

| $W_{RC}$ | Content of propylene-α-olefin copolymer in polypropylene-based resin material |

(2) Film-forming Material of the Present Invention

While the film-forming material of the present invention is mainly composed of the aforementioned polypropylene-based resin material, it may further contain additives conventionally used for polyolefin-based film materials, for example, antioxidant, neutralizer, weathering agent, inorganic filler, lubricant, anti-blocking agents, antistatic agent and the like.

Examples of the antioxidant include, for example, phenol compound antioxidants such as tetrakis[methylene-3-(3',5'-di-t-butyl-4'-hydroxyphen yl)propionate]methane, 2,6-di-t-butyl-4-methylphenol, n-octadecyl-3-(3',5'-di-t-butyl-4'-hydroxyphenyl)prop ionate, and tris(3,5-di-t-butyl-4-hydroxybenzyl) isocyanurate; phosphorus-containing antioxidants such as tris(2,4-di-t-butylphenyl) phosphite, tris(nonylphenyl) phosphite, distearylpentaerythritol diphosphite, and tetrakis(2,4-di-t-butylphenyl)-4,4'-biphenylenediphosphonite, and the like.

Examples of the neutralizer include, for example, salts of higher fatty acid such as calcium stearate, hydrotalcite and the like; examples of the inorganic filler and the anti-blocking agents includes, for example, calcium carbonate, silica, hydrotalcite, zeolite, aluminum silicate, magnesium silicate and the like; examples of the lubricant include, for example, higher fatty acid amides such as stearic acid amide and the like; and examples of the antistatic agents include, for example, fatty acid esters such as glycerin monostearate and the like.

While the amounts of these additives may be suitably selected depending on the intended use of the film and the like, they are preferably used in an amount of about 0.001–5% of the whole film-forming material in general.

The method for mixing the polypropylene-based resin material and the aforementioned additives is not particularly limited, and it can be performed, for example, by mixing methods utilizing conventional mixing apparatuses including mixers provided with high-speed agitators such as Henschel mixer (trade name), ribbon blender and tumbler mixer and the like (dry blend), as well as methods for pelletization utilizing a conventional single-screw extruder, double-screw extruder and the like.

(3) Biaxial Orienting

The biaxially oriented film of the present invention can be obtained by biaxially orienting the aforementioned film-forming material. The orienting can be performed by molding an unoriented sheet by the known T-die cast method or the like, and orienting it by a known biaxial orienting method. The orienting is preferably performed by sequential biaxial orienting for obtaining good straight cuttability. Specifically, it can be performed by the sequential biaxial orienting method where the sheet is first oriented along the MD direction and then oriented along the TD direction by the tentering method.

The orienting ratio for the MD direction for the biaxially oriented film of the present invention (longitudinal orienting ratio) is 3–10 times, preferably 5–8 times. On the other hand, the orienting ratio for the TD direction (transverse orienting ratio) can be, for example, in the range of 5–14 times, preferably 6–10 times. The ratio of the orienting ratio for the MD direction and the orienting ratio for the TD direction (orienting ratio for the MD direction/orienting ratio for the TD direction) is preferably 0.3–1.6, more preferably 0.5–1.2. If the ratio of orienting ratio is in this range, the polymer molecules can be oriented in the MD direction, and at the same time, the mean diameter of the dispersed particles can be made fine. Thus, a film that is excellent in the straight cuttability along the MD direction and strength along the TD direction can be obtained.

(4) Biaxially Oriented Polypropylene-based Film

In the biaxially oriented polypropylene-based film of the present invention, a mean dispersed particle diameter along the TD direction of the propylene-α-olefin copolymer domains which are dispersed as particles in the crystalline polypropylene is 0.1 μm or less. If a mean dispersed particle diameter is more than 0.1 μm, the straight cuttability along the MD direction as well as transparency are degraded.

On the other hand, as for the lower limit of the mean dispersed particle diameter, while it may be however small so long as it is in the determinable range, it is preferably 0.005 μm, more preferably 0.01 μm.

According to the present invention, it was found for the first time that a film which contains the copolymer domains having such a minute mean dispersed particle diameter is excellent in straight cuttability along the MD direction, and excellent in strength along the TD direction. Therefore, the film may be produced by any method so long as the obtained film satisfies the aforementioned condition concerning the mean dispersed particle diameter. Specifically, it can be obtained by orienting a polypropylene-based resin material produced by the aforementioned continuous polymerization method.

Particularly preferably, such a film can be obtained by orienting a polypropylene-based resin material which has been produced by the continuous polymerization method and has an MFR ratio of crystalline polypropylene and propylene-α-olefin copolymer of 10 or less so that the ratio of orienting ratio for the MD direction and orienting ratio for the TD direction should be within the range of 0.3–1.6.

In another aspect, the biaxially oriented propylene-based film of the present invention is a film wherein a ratio of birefringences along the MD direction and the TD direction (birefringence along the MD direction/birefringence along the TD direction) and a ratio of orienting ratios for the MD direction and the TD direction (orienting ratio for the MD direction/orienting ratio for the TD direction) of the film satisfy the following equation (I), preferably the following equation (II):

$$y \geq X - 0.1 \quad (I)$$

$$X + 0.6 \geq Y \geq X - 0.1 \quad (II)$$

wherein X represents the ratio of orienting ratios, and Y represents the ratio of birefringences.

That is, in the biaxially oriented film of the present invention, the polymer molecules are more strongly oriented along the MD direction than reflected by the ratio of the orienting ratios for the MD direction and the TD direction. A film which exhibits polymer molecule orientation satisfying the aforementioned equation (I) exhibits excellent straight cuttability along the MD direction and excellent strength along the TD direction as well as good transparency.

Further, if the ratio of birefringences along the MD direction and the TD direction (MD/TD) is 0.6 or more, more preferably 0.7 or more, better straight cuttability along the MD direction can be obtained. The upper limit of the ratio of birefringence is not particularly limited, but it is preferably around 10 or less in view of the strength along the traverse direction (TD direction).

The thickness of the biaxially oriented polypropylene-based film is not particular is limited, but it is preferably 10–100 μm, more preferably 15–70 μm in view of the film-forming property of the film.

Because the biaxially oriented polypropylene-based film of the present invention is excellent in the straight cuttability along the MD direction, and also excellent in the strength along the TD direction, it can be preferably used as a material for packaging heavy contents, material for food package for sandwiches, rice balls and the like.

The biaxially oriented polypropylene-based film of the present invention can also be used as a multilayer film comprising two or more layers, which can be prepared by laminating one or more films made of other resins on one or both sides of the film of the present invention. The other resins used for such a laminated film are not particularly limited, and various resins can be used depending on the purpose of the film. For example, when a layer composed of heat adhesive resin such as propylene-α-olefin copolymer having a low melting point is provided on the biaxially oriented film of the present invention, it can be used as various package materials. As production methods of such a multilayer film, the inline laminating method and the co-extrusion method, which are directly used for the production of the film, as well as the dry laminating method where the lamination is performed after the film production and the like can be utilized.

BEST MODE FOR CARRYING OUT THE INVENTION

The present invention will be further explained more specifically hereinafter with reference to the following examples, but the present invention is not limited by these examples.

Examples 1–6 and Comparative Examples 1–3

(1) Production of Film-forming Materials

The polypropylene-based resin materials shown in Table 1 were each added with 0.1% by weight of tetrakis [methylene-3-(3',5'-di-t-butyl-4'-hydroxyphenyl)propionate]methane as a phenol compound antioxidant, 0.1% by weight of tris(2,4-di-t -butylphenyl)phosphite as a phosphorus-containing antioxidant, and 0.1% by weight of calcium stearate as a neutralizer based on the whole film-forming material, blended by a Henschel mixer (trade name), melt-kneaded and pelletized by a single-screw extruder (aperture of 40 mm) to afford a film-forming material.

The polypropylene-based resin materials used in these examples were obtained by the continuous polymerization method where crystalline polypropylene (propylene homopolymer) was polymerized in the first step, and propylene-α-olefin copolymer (propylene-ethylene copolymer) was polymerized in the second step.

(2) Production of Biaxially Oriented Films

Each film-forming material in the form of pellets obtained above was melt-extruded at 260° C. by using an extruder equipped with a T-die, and cooled by a cooling roller at 30° C. to be solidified to obtain an unoriented sheet. This sheet was pre-heated by a pre-heating roller and oriented along the longitudinal direction (MD direction) between rollers to afford a uniaxially oriented film. Then, the uniaxially oriented film was oriented along the transverse direction (TD direction) in a heated transverse direction orienting machine to afford a biaxially oriented film having a thickness of 30 μm. Temperature and orienting ratio for orienting along the longitudinal direction, and temperature and orienting ratio for orienting along the transverse direction are shown in Table 1.

(3) Evaluation

Various physical properties of the obtained biaxially oriented films, i.e., mean dispersed particle diameter of copolymer domains along the TD direction in the film, ratio of birefringence, transparency (haze), strength (Young's modulus) and straight cuttability, are shown in Table 1. The methods for evaluating these physical properties are explained below.

(a) Evaluation of Straight Cuttability

Notches having a length of 10 mm and a width of 10 mm were formed in a film along the direction parallel to the longitudinal direction (MD direction) of the film, and the portion lies between the notches was pulled along the direction perpendicular to the film surface. When the film was cut by 20 cm, the width of the film (w) was measured. The evaluation was scored according to the following criteria.

| | |
|---|---|
| W ≧ 9 mm | 5 |
| 9 mm > W ≧ 6 mm | 4 |
| 6 mm > W ≧ 3 mm | 3 |
| 3 mm > W ≧ 0.1 mm | 2 |
| Broken before the cut reached 20 cm | 1 |

(b) Mean Dispersed Particle Diameter of Copolymer Domains

A biaxially oriented film was cut along a plain perpendicular to the MD direction, and colored with a ruthenium compound ($Ru_{O4}$) vapor for 48 hours. Then, it was cut in a thickness of about 100 nm with a diamond knife using an ultramicrotome to prepare an ultra-thin section. The obtained ultra-thin section was observed by a transmission electron microscope (trade name: JEOLEM100CX) at a magnification of 10000 times, and a mean dispersed particle diameter of copolymer domains was obtained by statistical calculation based on the obtained electron microscopic image.

(c) Ratio of Birefringence

Index of refraction along the MD direction (nx), index of refraction along the TD direction (ny), and index of refraction along the thickness direction (nz) of film were measured by an Abbe's refractometer using benzyl alcohol. Birefringence along the MD direction and birefringence along the TD direction were calculated according to the following equations, and the ratio of birefringence along the MD direction and birefringence along the TD direction (MD/TD) was calculated.

Birefringence along the MD direction=nx−nz

Birefringence along the TD direction=ny−nz (d) Haze

Haze of biaxially oriented film (in terms of %) was measured according to ASTM-D-1003, and used as a parameter of transparency. A smaller value indicates better transparency.

(e) Young's Modulus

According to ASTM-D-523, Young's modulus along the MD direction of biaxially oriented film was measured, and used as a parameter of rigidity. A larger value indicates that the film had higher rigidity.

TABLE 1

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| (1) Polypropylene-based resin | | | | | | | | | |
| Crystalline polypropylene*[1] content (wt %) | 83.5 | 76.9 | 67 | 67 | 67 | 80 | 90.1 | 80 | 100 |
| Copolymer*[2] content (wt %) | 16.5 | 23.1 | 33 | 33 | 33 | 20 | 9.9 | 20 | 0 |
| Propylene content in copolymer (wt %) | 64 | 60 | 60 | 62 | 55 | 40 | 36 | 50 | 0 |
| MFR of polypropylene-based resin (g/10 min) | 2.8 | 3.4 | 0.5 | 3.1 | 8 | 0.4 | 2.8 | 9.4 | 2 |
| MFR of crystalline polypropylene (g/10 min) | 3.2 | 5 | 0.5 | 3.1 | 11.5 | 0.4 | 3 | 22 | 2 |
| Ratio of MFR*[3] | 2 | 2 | 1 | 1 | 3 | 1 | 2 | 75 | * |
| (2) Production conditions of biaxially oriented film | | | | | | | | | |
| Longitudinal orienting | | | | | | | | | |
| Orienting temperature (° C.) | 148 | 148 | 148 | 115 | 140 | 148 | 148 | 143 | 145 |
| Orienting ratio (time) | 5.5 | 5.5 | 5.5 | 5 | 5 | 5.5 | 5.5 | 5 | 4.5 |
| Transverse orienting | | | | | | | | | |
| Orienting temperature (° C.) | 168 | 168 | 168 | 140 | 160 | 168 | 168 | 160 | 163 |
| Orienting ratio (time) | 8.3 | 7.1 | 7.1 | 6.7 | 8.4 | 7.1 | 8.3 | 8.1 | 8 |
| (3) Various physical properties of film | | | | | | | | | |
| Mean dispersed particle diameter of copolymer (μm) | <0.1 | <0.1 | <0.1 | <0.1 | <0.1 | <0.1 | <0.1 | 0.16 | |
| Ratio of bifringence of film (MT/TD) | 0.75 | 0.84 | 1.2 | 1.1 | 0.8 | 0.82 | 0.46 | 2.1 | 0.33 |
| Haze (%) | 5.5 | 6.2 | 12.6 | 11.4 | 10.7 | 20.5 | 4.1 | 75.8 | 3 |
| Young's modulus (MPa) | 1720 | 1510 | 1040 | 1010 | 970 | 1600 | 2120 | 1570 | 2400 |
| Straight cuttability | 5 | 5 | 5 | 5 | 4 | 4 | 2 | 1 | 1 |

*[1]) Crystalline polypropylene: propylene homopolymer
*[2]) Copolymer: propylene-ethylene copolymer
*[3]) Ratio of MFR = MFR of crystalline PP/MFR of copolymer As seen from the results shown in Table 1, the films of Examples 1–6 exhibited good straight cuttability along the MD direction as well as excellent rigidity (Young's modulus) and transparency (haze). In contrast, the film of Comparative Example 1 which had a lower ratio of the propylene-α-olefin copolymer in the polypropylene-based resin material and a lower ratio of birefringence could not afford good straight cuttability. In Comparative Example 2, the mean dispersed particle diameter of propylene-α-olefin copolymer was too large, and hence only a film exhibiting poor straight cuttability and poor transparency was afforded. In Comparative Example 3, the ratio of birefringence was low because the polypropylene-based resin material consisted solely of crystalline polypropylene was used, and hence good straight cuttability could not be obtained.

INDUSTRIAL APPLICABILITY

The biaxially oriented film of the present invention is excellent in straight cuttability along the MD direction, strength along the TD direction and transparency, as well as economy.

What is claimed is:

1. A biaxially oriented polypropylene film formed from a film-forming material which comprises a polypropylene resin material consisting of 40 to 88% by weight of crystalline prolypropylene, and 60 to 12% by weight of propylene-α-olefin copolymer dispersed as particles in the crystalline polypropylene, wherein the particles of the copolymer have a mean dispersed particle diameter of 0.1 μm or less along the TD direction and the polypropylene resin material has a ratio of MFRs of the crystalline polypropylene and the propylene-α-olefin copolymer of 0.1–5, and the propylene-α-olefin copolymer comprises 20 to 80% by weight of propylene units.

2. A biaxially oriented polypropylene film formed from a film-forming material which comprises a polypropylene resin material consisting of 40 to 88% by weight of crystalline prolypropylene, and 60 to 12% by weight of propylene-α-olefin copolymer, wherein a ratio of birefringences along the MD direction and the TD direction and a ratio of orienting ratios for the MD direction and the TD direction of the film satisfy the following equation (I):

$$Y \geq X - 0.1 \quad (I)$$

wherein X represents the ratio of orienting ratios, and Y represents the ratio of birefringences, and the polypropylene resin material has a ratio of MFRs of the crystalline polypropylene and the propylene-α-olefin copolymer of 0.1–5, and the propylene-α-olefin copolymer comprises 20 to 80% by weight of propylene units.

3. A biaxially oriented polypropylene film formed from a film-forming material which comprises a polypropylene resin material consisting of 40 to 88% by weight of crystalline polypropylene, and 60 to 12% by weight of propylene-α-olefin copolymer, wherein a ratio of birefringences along the MD direction and the TD direction of the film is 0.6 or more, and the polypropylene resin material has a ratio of MFRs of the crystalline polypropylene and the propylene-α-olefin copolymer of 0.1–5, and the propylene-α-olefin copolymer comprises 20 to 80% by weight of propylene units.

4. A biaxially oriented polypropylene film formed from a film-forming material which comprises a polypropylene resin material consisting of 50 to 88% by weight of crystalline propylene-α-olefin copolymer, and having a ratio of MFRs of the crystalline polypropylene and the propylene-α-olefin copolymer of 0.1–5, wherein the film is biaxially oriented so that a ratio of orienting ratios for the MD direction and the TD direction is 0.3 to 1.6 and the propylene-α-olefin copolymer comprises 20 to 80% by weight of propylene units.

5. A biaxially oriented polypropylene film formed from a film-forming material which comprises a polypropylene resin material consisting of 40 to 88% by weight of crystalline polypropylene, and 60 to 12% by weight of propylene-α-olefin copolymer dispersed as particles in the crystalline polypropylene, wherein the particles of the copolymer have a mean dispersed particle diameter of 0.1 μm or less along the TD direction and the propylene-α-olefin copolymer comprises 20 to 80% by weight of propylene units, and a MFR of the propylene-α-olefin copolymer is in the range of 0.1 to 20 g/10 minutes.

6. A biaxially oriented polypropylene film formed from a film-forming material which comprises a polypropylene resin material consisting of 40 to 88% by weight of crystalline polypropylene, and 60 to 12% by weight of propylene-α-olefin copolymer, wherein a ratio of birefringences along the MD direction and the TD direction and a ratio of orienting ratios for the MD direction and the TD direction of the film satisfy the following equation (I):

$$Y \geq X - 0.1 \quad (I)$$

wherein X represents the ratio of orienting ratios, and Y represents the ratio of birefringences, and the propylene-α-olefin copolymer comprises 20 to 80% by weight of propylene units, and a MFR of the propylene-α-olefin copolymer is in the range of 0.1 to 20 g/10 minutes.

7. A biaxially oriented polypropylene film formed from a film-forming material which comprises a polypropylene resin material consisting of 40 to 88% by weight of crystalline polypropylene, and 60 to 12% by weight of propylene-α-olefin copolymer, wherein a ratio of birefringences along the MD direction and the TD direction of the film is at least 0.6, and the propylene-α-olefin copolymer comprises 20 to 80% by weight of propylene units, and a MFR of the propylene-α-olefin copolymer is in the range of 0.1 to 20 g/10 minutes.

8. A biaxially oriented polypropylene film formed from a film-forming material which comprises a polypropylene resin material consisting of 40 to 88% by weight of crystalline polypropylene, and 60 to 12% by weight of propylene-α-olefin copolymer, and having a ratio of MFRs of the crystalline polypropylene and the propylene-α-olefin copolymer of 10 or less, wherein the film is biaxially oriented so that a ratio of orienting ratios for the MD direction and the TD direction is 0.3 to 1.6, and the propylene-α-olefin copolymer comprises 20 to 80% by weight of propylene units, and MFR of the propylene-α-olefin copolymer is in the range of 0.1 to 20 g/10 minutes.

9. A biaxially oriented polpropylene film formed from a film-forming material which comprises a polypropylene resin material consisting of 40 to 88% by weight of crystalline polypropylene, and 60 to 12% by weight of propylene-ethylene copolymer dispersed as particles in the crystalline polypropylene, wherein the particles of the copolymer have a mean dispersed particle diameter of 0.1 μm or less along the TD direction.

* * * * *